(12) United States Patent
Bianco et al.

(10) Patent No.: US 8,329,286 B2
(45) Date of Patent: Dec. 11, 2012

(54) PROCESS FOR THE PRODUCTION OF A MICROFIBROUS CHAMOIS WOVEN-NON-WOVEN FABRIC CONTAINING AN ELASTOMERIC NANOCOMPOSITE MATRIX

(75) Inventors: Paola Bianco, Amelia (IT); Walter Cardinali, Cerqueto di Marsciano (IT); Takafumi Hashimoto, Rome (IT); Giuseppe Serravezza, Terni (IT)

(73) Assignee: Alcantara S.p.A., Milan (IT)

( * ) Notice: Subject to any disclaimer, the term of this patent is extended or adjusted under 35 U.S.C. 154(b) by 1005 days.

(21) Appl. No.: 11/427,363

(22) Filed: Jun. 29, 2006

(65) Prior Publication Data

US 2007/0009724 A1 Jan. 11, 2007

(30) Foreign Application Priority Data

Dec. 14, 2005 (EP) ..................................... 05027323

(51) Int. Cl.
*D04H 1/00* (2006.01)

(52) U.S. Cl. .................................................... 428/292.1

(58) Field of Classification Search ........................ None
See application file for complete search history.

(56) References Cited

U.S. PATENT DOCUMENTS

| 5,514,734 | A  | * | 5/1996 | Maxfield et al. | ............... 523/204 |
| 6,407,155 | B1 | * | 6/2002 | Qian et al. | ..................... 524/445 |
| 6,533,975 | B1 |   | 3/2003 | Kosinski et al. | |
| 2002/0137419 | A1 | * | 9/2002 | Gandhi et al. | ................ 442/351 |

FOREIGN PATENT DOCUMENTS

| EP | 0 584 511 A1 | 3/1994 |
| EP | 1 676 949 A2 | 7/2006 |
| JP | 06207381 | 7/1994 |
| WO | WO 93/11190 | 6/1993 |
| WO | WO 97/49847 | 12/1997 |

* cited by examiner

*Primary Examiner* — Camie Thompson
(74) *Attorney, Agent, or Firm* — Pearne & Gordon LLP

(57) ABSTRACT

A composite material is described, comprising: (a) microfibers selected from synthetic microfibers; (b) elastomer/lamellar clay nanocomposite matrix; said lamellar clay being selected from organophilic lamellar clays and functionalized organophilic lamellar clays. Dyed chamois woven-non-woven fabrics are also described, obtained starting from said composite material.

23 Claims, No Drawings

PROCESS FOR THE PRODUCTION OF A MICROFIBROUS CHAMOIS WOVEN-NON-WOVEN FABRIC CONTAINING AN ELASTOMERIC NANOCOMPOSITE MATRIX

Process for the production of a microfibrous chamois woven-non-woven fabric containing an elastomeric nanocomposite matrix

STATEMENT REGARDING FEDERALLY SPONSORED REASEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND OF THE INVENTION

1. Field of the Invention

The present invention relates to a composite material comprising a microfibrous portion and an elastomer/lamellar clay nanocomposite matrix, preferably a polyurethane/lamellar clay nanocomposite matrix, wherein the lamellar clay is selected from the group consisting of organophilic clays and functionalized organophilic clays.

The present invention also relates to a chamois woven-non-woven fabric produced from the above described composite material and a dyed chamois woven-non-woven fabric.

The present invention further relates to a chamois woven-non-woven fabric containing UV stabilizers, produced from the above described composite material and a dyed chamois woven-non-woven fabric.

2. Description of Related Art

Chamois woven-non-woven fabrics typically include a polyurethane component, which s is not easily dyeable in comparison with other fabric polymers, such as polyesters and nylon. Furthermore, once dyed, such polyurethane materials are affected by a poor stability of the dyes to water washing and to rubbing.

Attempts have been made to increase the dyeability of the polyurethane matrix. Patents EP-A-0662981 and JP-6207381, for example, describe the production of a chamois woven-non-woven fabric (hereinafter also called a microfibrous non-woven fabric) from a microfiber containing a polyethylene terephthalate (PET) or a polyamide (Nylon 6 or Nylon 6-6) together with a polyurethane-urea having tertiary amine units within the chain, wherein said tertiary amine units are part of the polyol polyester forming the polyurethane. Therefore, not only in the microfibrous component of the microfibrous non-woven fabric is dyed using dispersed dyes, but also the polyurethane component is dyed using reactive dyes (capable of chemically binding to the amine and amide groups in the polyurethane chain), acidic dyes, or pre-metallized dyes (capable of binding by the formation of ionic and dative bonds).

This technology, however, has drawbacks deriving from the formulation of the polyurethane component, because the amine group in the chain may cause undesired effects of basic catalysis during polyurethane synthesis.

DESCRIPTION OF THE INVENTION

A process has been found which overcomes the above discussed drawbacks by stably anchoring the dye molecules without any adverse consequences on polyurethane synthesis.

In one embodiment, the process according to the principles of the present invention provides a composite material comprising: (a) synthetic microfibers; and (b) a elastomer/lamellar clay nanocomposite matrix, said lamellar clay being an organophilic lamellar clay or a functionalized organophilic lamellar clay. Dyed chamois woven-non-woven fabrics produced from said composite material are also disclosed.

The process according to the present invention is much simpler than those of the prior art and allows a more stable anchoring to the fabric not only of dyes, but also of other types of additives, such as UV stabilizers, flame retardants, and anti-fouling additives.

DETAILED DESCRIPTION OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

The present invention relates to a process for the preparation of a composite material including microfibers comprising synthetic microfibers and an elastomer/lamellar clay nanocomposite matrix, the lamellar clay being selected from the group consisting of organophilic lamellar clays and functionalized organophilic lamellar clays. This process comprises the following steps:

(a) preparation of microfibers having an island-sea type structure and the subsequent formation of a microfibrous felt starting from said microfibers; and (b) impregnation of said microfibrous felt with a delaminated lamellar organophilic clay/polyurethane nanocomposite dispersed in an inert solvent, or with a dispersed functionalized delaminated lamellar organophilic clay /polyurethane nanocomposite, and subsequent coagulation, thereby obtaining a composite material according the present invention.

The microfibers are produced from a polystyrene (for example, polyethylene terephthalate, polypropylene terephthalate, polybutylene terephthalate), a polyamide (for example, nylon 6, nylon 6-6 and nylon 12), and a polyacrylonitrile, preferably polyethylene terephthalate (PET) and polyamide Nylon 6 and Nylon 6-6, preferably polyethylene terephthalate.

In the preferred embodiment, the elastomer is a polyurethane. The term "polyurethane" is employed to mean a polymer consisting of flexible segments (soft segments) and rigid segments (hard segments).

The flexible segments can be polymeric portions based on:

polyethers, for example, polyethers derived from polytetramethylene glycol diol (PTMG) polyethylene glycol diol (PEG), or polypropylene glycol diol (PMPA);

polyesters, for example, esters of adipic acids such as polyhexamethylene adipate diol (PHA), poly(3-methyl pentamethylene) adipate diol (PMPA), or polyneopentapentyl adipate diol (PNA); other polyesters can be produced by the opening of circular molecules such as caprolactone (thus obtaining the diol polycaprolactone, in short PCL); or polycarbonates, for example, polyhexamethylene carbonate diol (PHC), polypentamethylene carbonate diol (PPMC), poly-(3-methyl-pentamethylene carbonate) diol (PMPC), polytetramethylene carbonate diol (PTMC), or blends and co-polymers thereof.

Polyesters can also be used as flexible segments, which are formed by the co-polymerization of the above-mentioned polyethers and polyesters, as well as of polyesters-co-polycarbonates obtained by a co-polymerization of polyesters and polycarbonates.

Polyols used for the synthesis of polyurethanes in the examples described below typically have an average molecular weight number ranging from 1000 to 3000, preferably between 1750 and 2250.

The rigid segments refer to polymeric chain portions deriving from the reaction of an organic diisocyanate, such as methylene-bis-(4-phenylisocyanate) (MDI) or toluene-diisocyanate (TDI), with a di-amine or glycolic chain. It is well known that the completion of the polyurethane synthesis can be performed with diamines, thus obtaining polyurethane-ureas, or with glycols, thus obtaining true polyurethanes.

Di-amines that may be used as chain extenders in the production of polyurethane-ureas, are, among the aliphatic amines, ethylene diamine (EDA), 1,3-cyclohexanediamine (1,3-CHDA), 1,4-cyclohexanediamine (1,4-CHDA), isophorondiamine (IPDA), 1,3-propylene diamine (1,3-PDA), 2-methylpenamethylenediamine (MPDM), 1,2-propylene diamine (1,2-PDA), and blends thereof. Examples of aromatic diamines that may be used as chain extenders are 3,3'-dichloro-4,4'-diaminodiphenyl methane, methylene-bis(4-phenylamine) (MPA), 2,4-diamino-3,5-diethyltoluene, and 2,4-diamino-3,5-di(methylthio)toluene. Said aliphatic and/or aromatic diamines can be added as such or be developed in situ by means of a reaction between the corresponding isocyanate and water. The chain extensions of true polyurethanes may also be obtained with diols such as ethylene glycol, tetramethylene glycol and blends thereof. Finally, chain extensions can also be obtained with dicarboxylic acids, such as malonic acid, succinic acid and adipic acid.

The reactions used for preparing polyurethanes and polyurethane ureas are normally performed in aprotic inert solvents, such as dimethyl acetamide (DMAc), dimethyl formamide (DMF), and N-methylpyrrolidone (NMP). These preparations are well known to experts in the field.

The definition "delaminated lamellar organophilic clay/polyurethane nanocomposite" relates to a dispersion of lamellar organophilic clay thoroughly mixed with a polyurethane or polyurethane-urea (hereunder also referred to with the generic term polyurethane, unless specifically indicated), until intercalated or exfoliated delaminated structures are formed.

The definition "lamellar organophilic clays" identifies lamellar silicates (phyllo-silicates) having negative charges on the lamellas and inorganic cations in the interlayer spaces, in which said cations have been substituted with organic "onium" ions, in order to increase the distance between the lamellas and the compatibility of the polymer which is to be intercalated in these spaces.

Said lamellar silicates may incorporate, between the layers, water molecules, alcohols, ketones, aliphatic, cyclic or aromatic amines, or other polar substances, swelling as a consequence.

Said lamellar silicates can also have a triple-layer structure, wherein each lamella consists of an octahedral layer based on magnesium or aluminum situated between two tetrahedral layers based on silica.

Examples of lamellar silicates are smectic clays, such as montmorillonite, saponite, beidelite, nontronite, ectorite, stevensite, bentonite, vermiculite, sauconite, magadite, keniatite, or substitutions or derivatives of the above clays and related blends. These clays can be natural or synthetic. Preferred lamellar clays are selected from montmorillonite, bentonite and relative blends.

The "onium" ions present in the lamellar organophilic clays are selected from primary, secondary, tertiary or quaternary ammonium compounds, pyridinium compounds, imidazolinium compounds, phosphonium compounds, and sulphonium compounds. Preferred examples of "onium" compounds are the tallow-alkyl-bis(hydroxyethyl)methyl ammonium ion, the tallow-alkyl-bis(hydroxymethyl)methyl ammonium ion, the (tallow hydrogenated alkyl) 2-ethylhexyl dimethyl ammonium ion, the bis(tallow hydrogenated alkyl) dimethyl ammonium ion, the bis(tallow hydrogenated alkyl) methyl ammonium ion, and the (tallow hydrogenated alkyl) benzyl dimethyl ammonium ion.

The term "tallow" indicates the fat product deriving from fat tissues of cattle and/or sheep. Tallow contains, in the form of glycerides, oleic, palmitic, stearic, myristic and linoleic acid, in addition to lower amounts of other fatty acids and cholesterol. One of the best known characteristics of tallow is its solidification point, which is between 40 and 46° C. The terms tallow-alkyl or hydrogenated tallow-alkyl are commercial terms which normally refer to blends of $C_{16}$-$C_{18}$ alkyl groups deriving from tallow.

Examples of commercially available lamellar organophilic clays (therefore containing organic "onium" ions) are organophilic montmorillonite containing the tallow-benzyldimethylammonium cation or the (tallow hydrogenated)benzyldimethylammonium cation.

These lamellar organophilic clays have an interlayer distance of at least 17 Å. Said distance can be effectively measured through X-ray diffraction.

Concerning functionalized organophilic clays, these clays are the above mentioned organophilic clays after functionalization by means of a reaction with one or more compounds selected from those having general formula (I):

$$(X-R)_n Si(-O-R')_p (R'')_m \qquad (I)$$

wherein n is an integer comprised between 1 an 3, m is an integer comprised between 0 an 2, and p=4-n-m provided that p>1;

R is selected from the group consisting of alkyl, alkylaryl, arylalkyl, alkoxyalkyl, alkoxyaryl, aminoalkyl, aminoaryl radicals and corresponding halogenated products, having from 2 to 30 carbon atoms, preferably from 2 to 6 carbon atoms, in which at least one hydrogen atom is substituted by X, or RX is a residue deriving from a UV stabilizing molecule, radical absorber or antioxidant, said residue being linked to the silicon atom present in the compound of general formula (I), preferably through a ureic (—NHCONH—) or urethane (—OCONH—) bond;

R' is an alkyl radical having from 1 to 6 carbon atoms, preferably from 1 to 3 carbon atoms;

R" is selected from the group consisting of —H and an alkyl, alcoxyalkyl, alkylamino-alkyl group having from 1 to 6 carbon atoms; and X is selected from the group consisting of —OH, —SH, —S$^-$M$^+$, —O$^-$M$^+$, —NHR$^1$, epoxide products, —N=C=O, —COOR$^1$, halogens, and unsaturated hydrocarbons, M$^+$ being a metal cation selected from the group consisting of Li$^+$, Na$^+$, K$^+$ and R$^1$, a hydrogen atom, and an alkyl radical having from 1 to 6 carbon atoms; X is preferably selected from —NH$_2$, epoxide products and alcohols, the above groups being dyeable.

The above functionalization process allows organophilic clays to be obtained, functionalized with X groups. In fact, the O—R' groups present in compound (I) allow the fixing of the —R—X groups to the silicate lamellas by reaction between the alkoxy-silane groups of compound (I) and the OH surfaces of the lamellas, with the formation of covalent siloxane bonds (X—R—Si—O—Si-lamella), which are particularly stable. Said functionalization can be performed in an aprotic polar solvent, for example DMF, at a temperature of 60-90° C. for 8-12 hours.

More details on this functionalization, as well as on the preparation process of the polyurethane/organophilic clay and polyurethane/functionalized organophilic clay nanocomposites can be found in the co-pending patent application under the joint name of the Milan Polytechnique and Alcantara SpA.

The quantity of organophilic clay as such or functionalized, ranges from 1 to 12% by weight with respect to polyurethane alone, preferably between 1 and 6% by weight with respect to the polyurethane.

The first step in the process of the present invention, i.e. the preparation of a microfiber having an island-sea-type structure and the subsequent formation of a microfibrous felt starting from said microfiber, is performed according to techniques well known to those skilled in the art, for example, according to the teachings of patents EP 0584511 A, U.S. Pat. No. 3,716,614 and U.S. Pat. No. 3,531,368. The island component of the microfiber used in the present invention has a yarn count between 0.3 and 0.0 1 denier, preferably between 0. 18 and 0. 1 denier, when a chamois woven-non-woven fabric is used, for example, as covering surface, or between 0.07 and 0.01 denier when the chamois woven-non-woven fabric is used, for example, for clothes, where a lighter material is required. The microfibrous felt is first impregnated with a binding agent soluble in hot water, such as polyvinyl alcohol, from which the sea component is subsequently extracted by means of processes disclosed in the above mentioned patents.

Step (b) is directed to the impregnation of the microfibrous felt obtained at the end of step (a) with the solution or dispersion of the delaminated lamellar organophilic clay/polyurethane nanocomposite or of the delaminated lamellar functionalized organophilic clay/polyurethane nanocomposite and subsequent coagulation of the same. In one embodiment, the microfibrous felt produced in step (a) is impregnated by means of a series of immersions in the solution or dispersion of the delaminated lamellar organophilic clay/polyurethane nanocomposite or of the delaminated lamellar functionalized organophilic clay/polyurethane nanocomposite. A coagulation in water or in a solution of water and aprotic solvent, for example DMF, is then performed at a temperature ranging, for example, from 20 to 50° C. The purpose of this coagulation is to allow the fixing of the polyurethane nanocomposite matrix to the microfiber. For the sake of convenience, the product obtained at the and of step (b) will be identified as "raw material".

The present invention also relates to a process for the preparation of dyed chamois woven-non-woven fabrics, the process comprising:

(i) preparing sheets having a thickness of about 1 mm and grinding the surface of said cut sheets, starting from the "raw material" obtained at the end of step (b) above;

(ii) dyeing the sheets prepared in step (i) by dyeing the microfibrous component and/or the elastomeric component; and (iii) optionally performing a subsequent finishing treatment.

The above chamois woven-non-woven fabrics have an amount of nanocomposite elastomeric matrix of 10 to 40% by weight, preferably 18 to 35% by weight.

Step (i) involves the reduction of the raw material, prepared as described in step (b) above, into sheets having a thickness of about 1 mm, and on the subsequent grinding of the surfaces of said cut sheets to raise the microfibrous tuft. Step (i) is performed according to known methods, for example, according to the teachings of the above mentioned patents.

Step (ii) involves the dyeing of the sheets prepared in step (i).

In the event a lamellar organophilic clay is incorporated into the polyurethane matrix (forming an organophilic clay/polyurethane nanocomposite), the dyeing treatment of step ii is preferably carried out using specific dyes capable of forming ionic bonds with the lamellas negatively charged (basic dyes) or with the "onium" ion present in the interlayer space of the clay (acidic dyes).

In the event a functionalized lamellar organophilic clay is incorporated into the polyurethane matrix (forming a functionalized organophilic clay/polyurethane nanocomposite), the dyeing treatment of step ii is preferably performed by means of specific dyes, called reactive dyes, capable of forming covalent bonds with the functional groups present on the functionalized clay. The now bound reactive dyes allow the microfibrous non-woven fabric to be dyed in its nanocomposite matrix, conferring to the dyed microfibrous non-woven fabric a particular resistance to the discharge of the dye during water and soap-water washings.

When the microfibers are made of a polyester (such as polyethylene terephthalate (PET), polypropylene terephthalate (PPT), or polybutylene terephthalate (PBT)), step (ii) can be performed in one or more steps. The separate dyeing of the microfibrous component can be performed using dyes such as dispersed dyes, and the elastomeric component can be dyed with different types of dyes. Preferably acidic or basic dyes will be used when the organophilic clay/polyurethane nanocomposite elastomeric matrix contains "onium" ions and the lamellas of clay have a net negative charge. Reactive dyes will preferably be used when the elastomeric matrix contains functionalized organophilic clay/polyurethane nanocomposites.

The microfibrous non-woven fabric may also be dyed in a single step that corresponds to the dyeing of the nanocomposite elastomeric component alone, when a polyester microfibrous is used that is dyed in mass with colored pigments.

On the contrary, when the microfibers are made of a polyamide (such as Nylon 6, Nylon 6-6 or Nylon 12), a single dyeing step can be performed that includes the dyeing of both components of the composite (microfiber and nanocomposite elastomeric matrix). In such a case, reactive or acidic dyes are used.

Using dispersed dyes for dyeing the microfiber requires a two-step process, comprising the dyeing of the microfiber and polyurethane nanocomposite matrix. The preferred chemical structures for the dispersed dyes are of the anthraquinone type, in order to assure a high stability to light of the dyed product.

The stability of said dyed products can be further increased by the application of UV stabilizers during the dyeing phase, which, by penetrating the microfiber together with the dye, are capable of increasing resistance to photo-degradation of the dye. A similar treatment with UV stabilizers can also be performed on the finished product by means of a finishing treatment.

The dyeing cycle of the polyester microfiber comprises of a first dyeing step, wherein the fiber is put in contact with a water dispersion containing dyes that have low solubility in water (dispersed dyes), surface-active agents that disperse the dye and facilitate its passage into the fiber, and pH conditions suitable for allowing the dye to penetrate inside the fiber itself. The temperature, normally ranging from 100 to 140° C., is selected to bring the polyester above its glass transition temperature, thus facilitating the diffusion of the dye in its interior.

On the other hand, the dyeing cycle for the nanocomposite matrix can be performed by bringing said microfibrous composite to a variable temperature of 20 to 100° C. with pH values ranging from 4 to 10, according to the nature of the reactive group present on the clay and on the dispersed dye. The duration of the dyeing process further depends on the dye type and on the functional group present on the clay when functionalized, and on the matrix morphology (higher or lower porosity). The dyeing process normally lasts between 20 minutes and 1-2 hours.

In addition to the dyeing treatment, a subsequent finishing treatment can be performed to confer additional specific properties, such as a softer feel. This includes processing the finished product under heat, up to a temperature of 250° C. and for the time strictly necessary, for example, for coupling with other substrates, printing, embossing, laminating, injection molding and thermo-forming.

The use of organophilic clays, either as such or functionalized by introducing reactive functional groups, also provides various other advantages. By means of the process according to the principles of the present invention, it is possible achieve a more stable anchoring (i.e. by forming covalent bonds) not only of dyes, but also of other types of additives, such as UV stabilizers, flame retardants, anti-fouling additives, provided these additives remain capable of linking to the reactive functional groups present on the functionalized organophilic clays that are used or with the "onium" ion modifying the organophilic clays.

The process according to the principles of the present invention does not cause appreciable increases in the rigidity of the microfibrous composite. This latter property, completely unexpected, has proven particularly important for keeping the sensorial properties of the composite unaltered, a property that is particularly appreciated in these types of products.

The process according to the principles of the present invention also enables the introduction of additives into the microfibrous composite (such as UV stabilizers and anti-fouling agents), by means of their direct fixing to the compounds having formula (I) prior to the formation of the functionalized organophilic clay/polyurethane nanocomposite, or to the non-dyed or already dyed composite microfibrous woven-non-woven fabric, provided that the elastomeric matrix of said composite material comprises a polyurethane/organophilic clay nanocomposite or a polyurethane/functionalized organophilic clay nanocomposite.

The following examples are provided for a better understanding of the present invention.

EXAMPLES

Description of the Materials

The following examples envisage the use of polyethylene terephthalate (hereinafter PET) for the production of a microfiber, of polyurethanes (hereinafter PU) as an elastomeric matrix and clays modified with alkyl ammonium cations, as such or functionalized with pending chains carrying reactive functional groups (present invention).

The PET microfiber is prepared by means of two-component conjugated spinning, of the island-sea type, wherein PET (island component) is spun in the presence of polystyrene (sea component) according to what has been widely illustrated in the patents mentioned in the description of item (a) of the process. The PU used in the examples are aromatic polyurethanes prepared starting from 4,4'methylene-bis-(phenylisocyanate), (hereinafter MDI), through synthesis in N,N-dimethyl formamide (hereinafter DMF), in which the pre-polymer obtained by reaction between MDI and diol polymers (hereinafter polyols), is extended by the addition of water, as already described in the previous patents (EP-A-0584511, EP-A-1323859). The polyols used are PHC (with MW 2,000) and PNA (with MW 2,000) for the polyurethane defined as PU1; PTMG (with MW 2,000) and PCL (with MW 2,000) for the polyurethane defined as PU2.

The clays used are montmorillonites modified by substitution of the interlayer metal cation with quaternary ammonium salts. In particular, the commercial montmorillonite Dellite® 43B was used (produced by Laviosa Chimica Mineraria SpA). Dellite® 43B is an organophilic montmorillonite containing the tallowbenzyldimethylammonium ion.

The dispersed dyes Rosso Dianix® EFB (Disperse Red 60), supplied by Dystar and Giallo Terasil® 4G (Disperse Yellow 211), supplied by Ciba, were used for dyeing the microfiber; the acidic dye Rosso Telon® FL (Acid Red 337) and the basic dye Rosa Astrazon® FG (Basic Red 13), supplied by Dystar and the reactive dyes Cibacron® Navy FN-B (Reactive Blue 238) and Blue Lanasol® 3R (Reactive Blue 50) supplied by Ciba, were used for dyeing the nanocomposite matrix.

The reactive dye used in the example is Tinuvin® 213, produced by Ciba. The stabilising additives Irganox® 1010 and Tinuvin® 326 are also produced by Ciba.

Example 1

Preparation of Polyurethane-Urea Based Polyester PU1, the Polymerization Being Carried Out in Mass 266 g of PHC and 114 g of PNA, both having a molecular weight of 2,000, were reacted in a nitrogen pressurised 2.5 liter reactor, at a temperature of 65° C., under stirring, with 139.4 g of MDI in a molar ratio isocyanate/diols of 2.9/1. After three hours from the beginning of the reaction, the pre-polymer thus obtained was cooled to temperature of 45° C. and diluted with DMF, having a humidity content of 0.03%, until a solution at 25% of pre-polymer was obtained, having a free NCO content of 1.46%. Maintaining the temperature at 45° C., 3.1 g of DBA and 5.9 g of water dissolved in 1 17.5 g of DMF were then slowly added over 5 minutes, so as to have a polyurethane-polyurea having a molecular weight of 43,000. After bringing the temperature to 65° C., the reactor was maintained under stirring for a further 8 hours, obtaining, in the end, a solution of polyurethane-urea, stable with time, having a viscosity of 21,000 mPa·sec at 20° C.

Example 2

Preparation of Polyurethane-Urea Based Polyester PU1, the Polymerization Being Carried Out in Solution The same procedure was followed as in example 1, with the only difference that the pre-polymerization reaction was effected in the presence of DMF. For this purpose, 266 g of PHC and 114 g of PNA, both having a molecular weight of 2,000, were reacted in a 2.5 liter nitrogen pressurised reactor, at a temperature of 45° C. and under stirring, with 139.6 g of MDI, in a molar ratio isocyanate/diols of 2.9/l in the presence of DMF, having a humidity content of 0.03%, so as to obtain a 30% solution of pre-polymer. 3 hours after contact of the reagents, a diluted pre-polymer was obtained having an NCO content of 1.66%. 3.1 g of DBA and 5.9 g of water dissolved in 305 g of DMF were then slowly added over 10 minutes, so as to have a polyurethane-polyurea having a molecular weight of 43,000. After bringing the temperature to 65° C., the reactor was maintained under stirring for a further 8 hours, obtaining, in the end, a solution of polyurethane-urea, stable with time, having a viscosity of 20,000 mPa·sec at 20° C.

Example 3

Preparation of Polyurethane-Urea Based Polyether/Polyester PU2

285 g of PTMG and 95 g of PCL, both having a molecular weight of 2,000, were reacted in a 2.5 liter nitrogen pressurised reactor, at a temperature of 65° C. and under stirring, with 134 g of MDI, in a molar ratio isocyanate/diols of 2.8/l. 3 hours after the beginning of the reaction, the pre-polymer thus obtained was cooled to a temperature of 45° C. and diluted with DMF, having a humidity content of 0.03% until a solution at 25% of pre-polymer was obtained with a free NCO content of 1.39%. Still maintaining the temperature at 45° C., 8.6 g of DBA and 5.1 g of water dissolved in 119 g of DMF were then slowly added over 5 minutes, so as to have a polyurethane-polyurea having a molecular weight of 15,000. After bringing the temperature to 65° C., the reactor was maintained under stirring for a further 8 hours, obtaining, in the end, a solution of polyurethane-urea, stable with time, having a viscosity of 23,000 mPa·sec at 20° C.

Example 4

Preparation of the Polyurethane/Clay Nanocomposite Through the Solution Intercalation Method 7 g of Dellite® 43B are weighed in a 2 litre beaker equipped with a magnetic stirrer and 150 g of DMF are added. The dispersion is left under stirring for 2-3 hours, and 843 g of a polyurethane PU1 or PU2 solution in DMF at 16.6% by weight of polymer (see examples 1-3) are then added. The solution is left for a further 12-14 hours under stirring before its use. The dispersion thus formed contains 14% by weight of polymer and 5% by weight of clay, with respect to the polymer, with a total dry content equal to 14.74%.

Example 5

Preparation of the Nanocomposite Polyurethane/Clay Functionalized with an Amino-Group, Epoxy Group, Containing a UV Stabilizer or with other Types of Functional Groups, Using the Solution Intercalation Method The same procedure described in example 4 is adopted, but making use, this time, of functionalized Dellite® 43B clay instead of the commercial organophilic clay as such, care being taken to finely pulverize the functionalized clay before its dispersion in DMF and, in any case, before adding the polyurethane solution in DMF to the dispersed clay. The dispersion thus obtained must be kept under stirring until its use for the production of a raw material. The functionalized Dellite® 43B clay containing a UV stabilizer, was prepared starting from the UV stabilizer Tinuvin 213 of Ciba. The preparation methods of the functionalized clays are described in the co-pending patent application under the joint name of Alcantara and Milan Polytechnique.

Example 6

Preparation of the Raw Microfibrous Non-Woven Fabric

A flock fiber is prepared, consisting of PET (0.10÷0.11 denier)microfibers in a polystyrene matrix, having the following characteristics: 3.8 denier, length 51 mm, 5 curlings/cm, strain ratio 2.5/l. In particular, the fiber is consists of 57 parts by weight of polyethylene terephthalate microfiber, 40 parts by weight of polystyrene matrix and 3 parts by weight of polyethylene glycol, the latter contained in the polystyrene matrix.

When observed in section, the fiber reveals the presence of 16 PET microfibers englobed in the polystyrene matrix. A raw felt is prepared by means of the flock fiber, which is subjected to needle-punching to form a needle-punched felt having a density of 0.185 g/cm$^3$. The needle-punched felt is dipped into a 20% by weight water solution of polyvinyl alcohol and is then dried. The needle-punched felt thus treated is subsequently immersed in trichloro ethylene until the complete dissolution of the polystyrene matrix of the fibers, with the consequent formation of a woven-non-woven fabric made of PET microfibers. The woven-non-woven fabric thus formed is dried, and an intermediate product is obtained, called D1 felt.

The elastomer solution prepared according to examples 1-5, was diluted with DMF, containing 5.1 g of Irganox® 1010 and 15.4 g of Tinuvin® 326 to form a 14% by weight solution. A polymer having a high porosity is obtained by coagulation in water of a film of a solution thus prepared.

The felt D1 is dipped into the elastomer solution of examples 1-5 and the woven-non-woven fabric thus impregnated is first squeezed by passing it through a pair of rolls and subsequently immersed for 1 hour in a water bath maintained at 40° C. A coagulated sheet is thus obtained which is passed into a water bath heated to 80° C., to extract the residual solvent and polyvinyl alcohol. After drying, a composite microfibrous sheet is obtained, containing 32% of nanocomposite elastomeric matrix, which is cut into sheets having a 1 mm thickness and the sheets thus obtained are then subjected to grinding to raise the tuft. A raw microfibrous woven-non-woven fabric is obtained having a thickness of 0.8 mm, ready to be subjected to a subsequent dyeing treatment.

Example 7

Dyeing of the Microfibrous Woven-Non-Woven Fabric with Dispersed Dyes

The raw material as prepared in example 6, is subjected to dyeing, by operating at 120° C. for 1 hour in an aqueous dye bath containing the dispersed dye Rosso Dianix E-FB, in an amount of 0.3% by weight with respect to the raw, synthetic microfibrous woven-non-woven fabric.

At the end of the treatment, a finished dyed synthetic chamois leather is obtained, which, after a further treatment under reducing conditions with sodium hydrosulphite in an alkaline environment to eliminate the excess of non-fixed dye, is subjected to a test to evaluate the resistance of the dye to wet rubbing (AATCC 8-2001), soap washing (AATCC 61-2001) and dry washing.

The evaluations shown in the following table, relating to the dyed microfibrous non-woven fabrics were effected as follows:

(a) as far as the discharge of dye on the test sample (multi-fiber felt for washing and cloth for rubbing) the fouling is evaluated by comparison with the grey scale ISO 105A03;

(b) for the shade change of the sample, before and after the test, the ISO 105A02 grey scale is used.

The evaluation is performed by comparing the shade change or dirtying level with the standard contrasts by means of the appropriate grey scale. An evaluation equal to 5 corresponds to no change in color shade or transfer, whereas an evaluation of 1 corresponds to the maximum contrast appearing in the grey scale used.

| Test | Evaluation |
|---|---|
| WET RUBBING | 3/4 |
| DRY RUBBING | 4 |
| WASHING WITH SOAP (shade change) | 5 |
| WASHING WITH SOAP (color discharge on multi-fibers) | 4 |
| DRY WASHING (shade change) | 5 |
| DRY WASHING (color discharge on multi-fibers) | 4/5 |

In the same way, another portion of raw material was dyed under the same conditions, using the disperse color yellow Terasil 4G at 0.5% by weight with respect to the raw, synthetic microfibrous woven-non-woven fabric. The evaluations of the dye resistance to wet rubbing, soap washing and dry washing are shown in the following table.

| Test | Evaluation |
|---|---|
| WET RUBBING | 4 |
| DRY RUBBING | 4/5 |
| WASHING WITH SOAP (shade change) | 5 |
| WASHING WITH SOAP (color discharge on multi-fibers) | 5 |
| DRY WASHING (shade change) | 5 |
| DRY WASHING (color discharge on multi-fibers) | 5 |

Example 8

Dyeing of the Elastomeric Component of the Microfibrous Non-Woven Fabric (Impregnated with Polyurethane/Clay Nanocomposite) with Acidic Dyes The raw product is prepared as described in example 6 starting from mass dyed PET, using the polyurethane/clay nanocomposite prepared in example 4.

The dyeing of the polyurethane nanocomposite matrix is effected by operating at 80° C. for 45 minutes in an aqueous dyeing bath at pH 7, containing the acidic dye Rosso FL Telon, in an amount of 3% by weight with respect to the raw microfibrous non-woven fabric.

At the end of the treatment, a microfibrous non-woven fabric is obtained, dyed in the polyurethane portion which, after washing with a surface-active product at 65° C. for 20 minutes to eliminate the excess of non-fixed dye, is subjected to tests for the evaluation of the dye resistance to wet rubbing (AATCC 8-2001), soap washing (AATCC 61-2001) and dry washing, and the values are shown in the following table.

| Test | Evaluation |
|---|---|
| WET RUBBING | 4 |
| DRY RUBBING | 4 |
| WASHING WITH SOAP (shade change) | 5 |
| WASHING WITH SOAP (color discharge on multi-fibers) | 4/5 |
| DRY WASHING (shade change) | 5 |
| DRY WASHING (color discharge on multi-fibers) | 4/5 |

Example 9

Dyeing of the Elastomeric Component in the Microfibrous Non-Woven Fabric (Impregnated with Polyurethane/Clay Nanocomposite) with Basic Dyes The raw product is prepared as described in example 6 starting from mass dyed PET, using the polyurethane/clay nanocomposite prepared in example 4.

The dyeing of the polyurethane nanocomposite matrix is effected by operating at 80° C. for 1 hour in an aqueous dyeing bath at pH 4.5, containing the basic dye Astrazon Rosa FG, in an amount of 3% by weight with respect to the raw synthetic microfibrous woven-non-woven fabric.

At the end of the treatment, a microfibrous non-woven fabric is obtained, dyed in the polyurethane portion which, after washing with a surface active product at 65° C. for 20 minutes to eliminate the excess of dye and after finishing, is subjected to tests for the evaluation of the dye resistance to wet rubbing (AATCC 8-2001), soap washing (AATCC 61-2001) and dry washing, and the values are shown in the following table.

| Test | Evaluation |
|---|---|
| WET RUBBING | 2/3 |
| DRY RUBBING | 3/4 |
| WASHING WITH SOAP (shade change) | 5 |
| WASHING WITH SOAP (color discharge on multi-fibers) | 4/5 |
| DRY WASHING (shade change) | 5 |
| DRY WASHING (color discharge on multi-fibers) | 4/5 |

Example 10

Dyeing of the Functionalized Nanocomposite Matrix of the Microfibrous Non-Woven Fabric with Reactive Dyes The raw product is prepared as described in example 6 starting from mass dyed PET, using the nanocomposite polyurethane/clay functionalized with amino groups, prepared in example 5.

The dyeing of the elastomeric nanocomposite matrix is effected using the reactive dye Cibracron® Navy FN-B under the following conditions:

treatment of the raw product with a saline solution of 3% dye containing 60 g/l of NaCl, at 80° C. for 30 minutes;

dyeing of the raw product at 60° C. for 1 hour, obtained by the addition of a solution of $Na_2CO_3$ 18 g/l, capable of freeing the reactive form of the dye.

At the end of the treatment, a microfibrous non-woven fabric is obtained dyed on the polyurethane part which, after washing with a surface-active product at 80° C. for 20 minutes to eliminate the excess of non-fixed dye, is subjected to the evaluation test of the dye resistance to wet rubbing (AATCC 8-2001), soap washing (AATCC 61-2001) and dry washing, and the values are shown in the following table.

| Test | Evaluation |
| --- | --- |
| WET RUBBING | 3/4 |
| DRY RUBBING | 4 |
| WASHING WITH SOAP (shade change) | 5 |
| WASHING WITH SOAP (color discharge on multi-fibers) | 5 |
| DRY WASHING (shade change) | 5 |
| DRY WASHING (color discharge on multi-fibers) | 5 |

In the same way, another portion of raw product was dyed in the nanocomposite elastomeric matrix by means of the reactive dye Lanasol® Blue 3R, using an aqueous solution at pH 8.5 of 3% dye and dyeing at a temperature of 80° C. for 1 hour.

At the end of the treatment, a microfibrous non-woven fabric is obtained dyed on the polyurethane part which, after washing with a surface active product at 80° C. for 20 minutes to eliminate the excess of non-fixed dye, is subjected to the evaluation test of the dye resistance to wet rubbing (AATCC 8-2001), soap washing (AATCC 61-2001) and dry washing, and the values are shown in the following table.

| Test | Evaluation |
| --- | --- |
| WET RUBBING | 3/4 |
| DRY RUBBING | 4 |
| WASHING WITH SOAP (shade change) | 5 |
| WASHING WITH SOAP (color discharge on multi-fibers) | 5 |
| DRY WASHING (shade change) | 5 |
| DRY WASHING (color discharge on multi-fibers) | 5 |

Dyeing with reactive dyes was also effected on a microfibrous non-woven fabric prepared as described in example 6, starting from mass dyed PET, but using a nanocomposite matrix of polyurethane/functionalized clay containing epoxide groups(prepared as described in example 5). Before the dyeing treatment with reactive dyes, a treatment was effected for the opening of the epoxy ring carried out in an aqueous alkaline environment (pH 10 and a temperature of 80° C. for 20 minutes), obtaining results, in terms of dyeing and dye resistance to washing and rubbing, analogous to the previous ones.

Example 11

Dyeing of the Microfibrous Non-Woven Fabric with Reactive Dyes (Functionalized Nanocomposite Matrix) and Dispersed Dyes (Fiber)

The raw product prepared as described in example 6, using the elastomeric nanocomposite polyurethane/clay functionalized with amino groups, prepared as described in example 5, was subjected to dyeing in its nanocomposite elastomeric matrix, with Cibacron Navy FN-B as already described in the previous example 10.

The dyed raw product, after washing with a surface-active agent at 80° C. for 20 minutes to remove the non-fixed dye, was subjected to the dyeing of its fiber component using the dispersed dye rosso Dianix E-FB under the conditions already described in example 7. The raw product obtained, after dyeing the nanocomposite elastomeric matrix with a reactive dye and the fiber portion with a dispersed dye, has an intermediate coloring between that of the fiber and that of the elastomeric matrix (a violet color is obtained). The dyed microfibrous non-woven fabric is then subjected to an evaluation test of the dye resistance to wet rubbing (AATCC 8-2001), soap washing (AATCC 61-2001) and dry washing; the values found are shown in the following table.

| Test | Evaluation |
| --- | --- |
| WET RUBBING | 3/4 |
| DRY RUBBING | 4 |
| WASHING WITH SOAP (shade change) | 5 |
| WASHING WITH SOAP (color discharge on multi-fibers) | 4 |
| DRY WASHING (shade change) | 5 |
| DRY WASHING (color discharge on multi-fibers) | 4/5 |

Example 12

Preparation of the Raw Product of a Microfibrous Non-Woven Fabric, Using the Nanocomposite PU2/Clay Functionalized with UV Stabilizer A raw product was prepared, as described in example 6, with the elastomeric nanocomposite PU2/functionalized with a UV stabilizer, prepared as described in example 5, in this case omitting the addition of the additive Tinuvin'' 326 (UV stabilizer) in the impregnation solution.

Example 13

Accelerated UV Aging Test of the Raw Product Containing the Nanocomposite of Polyurethane/Clay Functionalized with a UV Stabilizer A sample of a microfibrous non-woven fabric was subjected to a UV accelerated ageing test, using as comparison a raw product of PU2 as such, produced without the addition of the UV stabilizer Tinuvin® 326, in order to evaluate the efficacy of the stabilizer introduced into the raw product based on fiber and nanocomposite PU2/clay functionalized with the UV stabilizer of example 12. The conditions adopted are those prescribed in the regulation DIN 75202 (PV 1303); in particular:
Chamber relative humidity=20±10%;
Irradiation=60 W/m$^2$ (cumulative between 300-400 nm);
Black panel temperature=100±3° C.;
Chamber temperature=65±3° C.;
Exposure duration=1 Fakra (10 MJ/m$^2$).

The raw product containing the stabilizer bound to the clay proved to have resisted the test much better, as it has a much lower yellowing degree than the reference sample, with no additive, and better physico-mechanical characteristics.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

What is claimed is:

1. A composite material comprising:
   a. microfibers selected from synthetic microfibers; and
   b. an elastomer/lamellar clay nanocomposite matrix, wherein said lamellar clay is dispersed and thoroughly mixed within said nanocomposite matrix until intercalated or exfoliated delaminated structures are formed, and wherein said lamellar clay is an organophilic lamellar clay functionalized by means of a reaction with one or more compounds selected from those having general formula (I):

$(X-R)_n Si(-O-R')_p (R'')_m$           (I)

wherein n is an integer comprised between 1 and 3, m is an integer comprised between 0 and 2, and p=4−n−m provided that p≧1;
   R is selected from the group consisting of alkyl, alkylaryl, arylalkyl, alkoxyalkyl, alkoxyaryl, aminoalkyl, aminoaryl radicals and corresponding halogenated products, having from 2 to 30 carbon atoms, in which at least one hydrogen atom is substituted by X, or RX is a residue deriving from a UV stabilizing molecule, radical absorber or antioxidant, said residue being linked to the silicon atom present in the compound of general formula (I);
   R' is an alkyl radical having from 1 to 6 carbon atoms;
   R'' is selected from the group consisting of —H and an alkyl, alcoxyalkyl, alkylamino-alkyl group having from 1 to 6 carbon atoms; and
   X is selected from the group consisting of —OH, —SH, —S$^-$M$^+$, —O$^-$M$^+$, —NHR$^1$, epoxide products, —N=C=O, —COOR$^1$, halogens, and unsaturated hydrocarbons, M$^+$being a metal cation selected from the group consisting of Li$^+$, Na$^+$, K$^+$ and R$^1$, a hydrogen atom, and an alkyl radical having from 1 to 6 carbon atoms; the above groups being dyeable.

2. The composite material according to claim 1, wherein the microfibers are selected from microfibers based on polyesters, polyamides and polyacrylonitriles.

3. The composite material according to claim 2, wherein the microfibers are selected from microfibers based on polyethylene terephthalate, polypropylene terephthalate, polybutylene terephthalate, nylon 6, nylon 6-6 and nylon 12.

4. The composite material according to claim 3, wherein the microfibers are selected from microfibers based on polyethylene terephthalate.

5. The composite material according to claim 1, wherein the elastomer is selected from polyurethane and polyurethane-urea and blends thereof, and the microfibers are selected from polyesters.

6. The composite material according to claim 1, wherein the functionalized organophilic lamellar clay is present in an amount ranging from 1 to 12% by weight with respect to polyurethane alone.

7. The composite material according to claim 6, wherein the functionalized organophilic lamellar clay is present in an amount ranging from 1 to 6% by weight with respect to the polyurethane.

8. The composite material according to claim 1, wherein the lamellar clay is selected from smectic clays, such as, for example, saponite, deidellite, montmorillonite, nontronite, ectorite, vermiculite, stevensite, bentonite, sauconite, magadite, keniatite and swollen micas.

9. The composite material according to claim 8, wherein the lamellar clay is selected from montmorillonite.

10. The composite material according to claim 1, wherein the organophilic lamellar clay is selected from lamellar clays containing "onium" ions between the lamellas of said clays.

11. The composite material according to claim 10, wherein the "onium" ions are selected from ammonium compounds, pyridinium compounds, imidazolinium compounds or phosphonium compounds.

12. The composite material according to claim 10, wherein the "onium" ions are selected from tallowbenzyldimethylammonium ions and (hydrogenated tallow) benzyldimethylammonium ions.

13. The composite material according to claim 1, wherein the functionalized organophilic lamellar clays are selected from functionalized organophilic lamellar clays with polar groups selected from NHR, SH, epoxides, alcohols, COOR, unsaturated hydrocarbons, sulphonic acids, with R selected from hydrogen and alkyl radicals having from 1 to 10 carbon atoms.

14. The composite material according to claim 13, wherein the functionalized organophilic lamellar clays are selected from functionalized organophilic lamellar clays with dyeable polar groups selected from NH2, SH, epoxides and alcohols.

15. The composite material according to claim 1, wherein the polyurethane/functionalized organophilic lamellar clay nanocomposite matrix is dyeable with cationic or anionic dyes or reactive dyes.

16. The composite material according to claim 1, wherein the microfibrous part contains polyester microfibers dyed in mass with colored dyes.

17. The composite material according to claim 1, wherein the functionalized organophilic lamellar clays are selected from functionalized organophilic lamellar clays containing a residue deriving from molecules of antioxidants, radical absorbers and UV stabilizers.

18. Dyed chamois woven-non-woven fabrics obtained starting from the composite material according to claim 1.

19. The dyed, chamois woven-non-woven fabrics according to claim 18, wherein the microfibrous component has a yarn count of between 0.3 and 0.01 denier.

20. The dyed, chamois woven-non-woven fabrics according to claim 19, wherein the microfibrous component has a yarn count of between 0.18 and 0.1 denier.

21. The dyed, chamois woven-non-woven fabrics according to claim 19, wherein the microfibrous component has a yarn count of between 0.07 and 0.01 denier.

22. The woven-non-woven fabrics according to claim 18, wherein the nanocomposite elastomeric matrix is present in an amount of 10 to 40% by weight.

23. The woven-non-woven fabrics according to claim 22, wherein the nanocomposite elastomeric matrix is present in an amount of 18 to 35% by weight.

* * * * *